(12) United States Patent
Sudar

(10) Patent No.: US 8,292,331 B2
(45) Date of Patent: Oct. 23, 2012

(54) ANCHORING ELEMENT FOR PIPE COUPLINGS

(75) Inventor: Damir Sudar, Bad Ragaz (CH)

(73) Assignee: Straub Werke AG, Wangs (CH)

( * ) Notice: Subject to any disclaimer, the term of this patent is extended or adjusted under 35 U.S.C. 154(b) by 128 days.

(21) Appl. No.: 12/811,102

(22) PCT Filed: Feb. 24, 2009

(86) PCT No.: PCT/IB2009/050739
§ 371 (c)(1),
(2), (4) Date: Jul. 27, 2010

(87) PCT Pub. No.: WO2009/107061
PCT Pub. Date: Sep. 3, 2009

(65) Prior Publication Data
US 2010/0283236 A1    Nov. 11, 2010

(30) Foreign Application Priority Data
Feb. 28, 2008   (CH) .................................. 301/2008

(51) Int. Cl.
*F16L 17/00*    (2006.01)
(52) U.S. Cl. .................... 285/104; 285/112; 285/373
(58) Field of Classification Search .................. 285/53, 285/104, 112, 369, 373, 372, 417, 418, 419
See application file for complete search history.

(56) References Cited

U.S. PATENT DOCUMENTS

| | | | |
|---|---|---|---|
| 2,313,419 A * | 3/1943 | Bush .............................. | 428/122 |
| 3,222,769 A | 12/1965 | LePlae | |
| 3,501,179 A * | 3/1970 | Felton et al. .................. | 285/373 |
| 4,339,860 A | 7/1982 | Hayashi | |
| 4,508,369 A | 4/1985 | Mode | |
| 4,616,858 A | 10/1986 | Sauer | |
| 4,626,002 A | 12/1986 | Hagemeister et al. | |

(Continued)

FOREIGN PATENT DOCUMENTS

CA    2656907 A1    1/2008

(Continued)

OTHER PUBLICATIONS

International Preliminary Report on Patentability for corresponding PCT Application No. PCT/IB2009/050739, Sep. 21, 2010 (PCT/IB/373/ISA/237).

(Continued)

*Primary Examiner* — James Hewitt
*Assistant Examiner* — Jay R Ripley
(74) *Attorney, Agent, or Firm* — Timothy X. Gibson; Gibson & Dernier LLP

(57) ABSTRACT

A sleeve-shaped anchoring element for pipe couplings sealing pipes, with an essentially cylindrical housing and a sealing element of rubber-elastic material that is arranged in the housing. The anchoring element is arranged in the housing and has individual longitudinal supports connected to each other by means of deformable webs and having a C-shaped longitudinal section. Ends of the longitudinal supports are configured as limbs angled radially inwards. Free ends of the limbs can be brought into engagement with at least one of the pipes when the pipe coupling is clamped. Only one single web is provided between two adjacent longitudinal supports, and the two webs of a longitudinal support are arranged offset with respect to each other in the axial direction for connection to the adjacent longitudinal supports.

16 Claims, 6 Drawing Sheets

U.S. PATENT DOCUMENTS

| | | | |
|---|---|---|---|
| 4,676,856 A * | 6/1987 | Shigeki et al. | 156/201 |
| 4,830,898 A | 5/1989 | Smith | |
| 4,930,791 A | 6/1990 | Ungchusri et al. | |
| 5,137,305 A * | 8/1992 | Straub | 285/112 |
| 5,249,353 A | 10/1993 | Kranz | |
| 5,273,322 A | 12/1993 | Straub | |
| 5,752,345 A | 5/1998 | Bright et al. | |
| 5,931,476 A | 8/1999 | Ungchusri et al. | |
| 6,742,255 B1 | 6/2004 | Frappier | |
| 7,866,707 B2 | 1/2011 | Sudar | |
| 2002/0140232 A1 * | 10/2002 | Bohrer et al. | 285/369 |
| 2007/0232147 A1 | 10/2007 | Herberg et al. | |
| 2010/0032942 A1 | 2/2010 | Sudar | |

FOREIGN PATENT DOCUMENTS

| | | | |
|---|---|---|---|
| EP | 288993 A1 * | 11/1988 | |
| EP | 0447955 A | 9/1991 | |
| EP | 1245889 A | 10/2002 | |
| EP | 1840434 A | 10/2007 | |
| WO | 2006100628 A | 9/2006 | |
| WO | WO 2006100628 A1 * | 9/2006 | |
| WO | 2008004173 A | 1/2008 | |

OTHER PUBLICATIONS

International Search Report for corresponding PCT Application No. PCT/IB2009/050739, Jun. 2, 2009 (PCT/ISA/210).

* cited by examiner

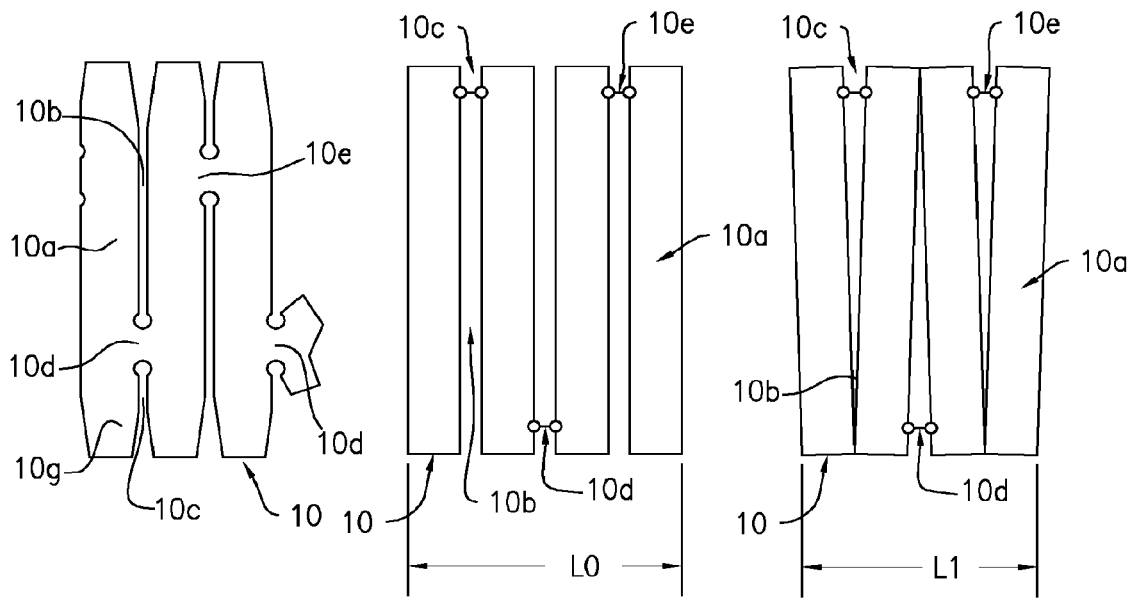
*FIG. 10*  *FIG. 11*  *FIG. 12*
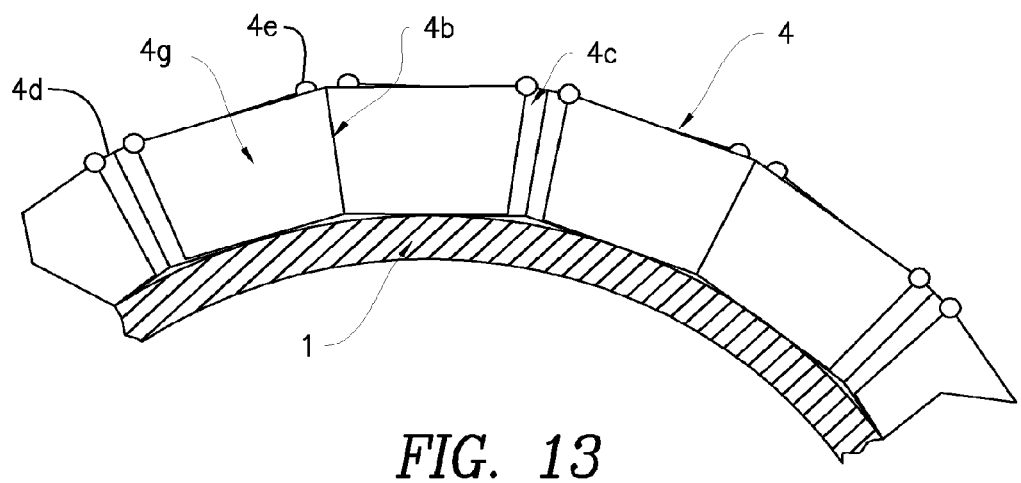
*FIG. 13*

ANCHORING ELEMENT FOR PIPE COUPLINGS

This application is a section 371 national-phase entry of PCT International application no. PCT/IB2009/050739 filed on Feb. 24, 2009 and designating the U.S. parent PCT Intn'l. application no. PCT/IB2009/050739, claims benefit of priority to Swiss national application number CH-301/2008 filed on Feb. 28, 2008, which benefit of priority is also claimed and applicable in the present U.S. national-phase application.

FIELD OF THE INVENTION

The invention relates to a sleeve-shaped anchoring element for pipe couplings for connecting flat-ended pipes, with an essentially cylindrical housing and at least one sealing element which is arranged in the housing and consists of a rubber-elastic material, wherein the anchoring element is arranged in the housing, consists essentially of individual longitudinal supports which are connected to each other by means of deformable webs, run essentially in the axial direction and have a C-shaped longitudinal section, and the ends of which are configured as limbs which are angled radially inwards, wherein, when the pipe coupling is clamped, the free ends of the limbs can be brought into engagement with at least one of the pipes and the webs are formed by longitudinal slots in the anchoring element which run axially between the individual longitudinal supports and emanate from the free ends of the limbs.

BACKGROUND

Pipe couplings of the above-mentioned type are used to connect flat-ended pipes in a manner resistant to tensile forces. When the pipe coupling is clamped, a force-fitting connection is produced between the two pipes by means of the anchoring element.

Such a pipe coupling is known for example from the applicant's WO 2006/100628 A1. The anchoring element can in this solution be in one piece or consist of two individual parts. It is however advantageous for the flow of the forces to be transmitted if the anchoring element is in one piece, as during simple tensile loading of the pipes, the tensile forces are transmitted directly via the anchoring element, the housing is not involved and thus can be dimensioned with correspondingly thinner walls and thus lighter. The anchoring element according to this known document consists of individual longitudinal supports which are in each case connected to each other by means of a plurality of webs.

This anchoring element is relatively rigid, seen in the circumferential direction. It can therefore be deformed only to a very limited extent in the circumference or in the diameter and can thus be adapted only to a very limited extent to for example different outer diameters of the pipe to be connected.

SUMMARY OF THE INVENTION

The invention is therefore based on the object of creating an anchoring element for a pipe coupling which has a high degree of flexibility in the circumferential direction and at the same time good load resistance in the axial direction.

According to the invention, this is achieved by providing in each case only one single web between two adjacent longitudinal supports and arranging the two webs of a longitudinal support in each case offset in the axial direction relative to each other for connection to the adjacent longitudinal supports in the circumferential direction. The offset arrangement of the webs, that is, the fact that they do not align with each other, means that the anchoring element can be deformed, or in particular compressed, in the circumferential direction. The compression of the anchoring element in the circumferential direction also causes its outer and inner diameter to be reduced.

An advantageous configuration of the anchoring element consists in distributing the webs in an asymmetrical manner along the longitudinal supports. The asymmetrical arrangement of the webs means that the webs together with the longitudinal supports form a kind of zigzag shape, with the webs assuming the function of joints.

The webs are expediently arranged offset outwards towards the limbs alternately in the longitudinal direction of the longitudinal supports. The fact that the webs are arranged offset outwards towards the limbs means that the slots between the longitudinal supports can practically only be reduced, but not enlarged when the anchoring element is radially compressed.

As mentioned above, the webs form a kind of joint when the anchoring element is radially compressed. In order to achieve good deformability of the webs it is therefore advantageous if at least some of the webs have at least one cross section taper in the cross section running in the axial direction. The resistance of the webs to bending and compression can be kept even lower by means of the cross section taper.

The cross section taper is expediently formed by at least one centric cut-out in the central region of the web. This cut-out can for example be produced by a drill hole or a punch hole. The deformation resistance of the remaining web cross section is further reduced by this cut-out.

A further advantageous configuration consists in that the cross section taper is formed by at least one notch in the central region of the web. Such notches could for example be stamped or introduced by means of a cutting process. Notches have in principle comparable effects on the properties of the webs to the above-mentioned centric cut-outs.

According to a further configuration of the invention, the longitudinal supports are provided in their central region with a bead which projects radially towards the central longitudinal axis of the anchoring element. Such a bead has a plurality of advantages: Firstly, the bead forms a point of weakness which makes a bending movement of the longitudinal supports around the region of the bead easier. Secondly, a bead makes it possible to fix the anchoring element axially in the housing.

The beads are advantageously essentially U-shaped with a flat bottom in the longitudinal section of the longitudinal supports. The flat bottom of the beads impedes their notch effect. Moreover, it is ensured that the sealing element is not damaged by sharp edges.

All the longitudinal supports advantageously have a bead in the same axial position. The beads of the longitudinal supports together thus form a kind of circumferential groove on the outer face of the anchoring element.

The housing expediently has around the circumference on its inner side at least one knob which engages in a form-fitting manner in the bead of the anchoring element. The form-fitting engagement of the knob(s) of the housing in the bead of the anchoring element prevents the anchoring element from slipping axially out of the housing. The housing thus does not need any additional side walls for this function.

For uniform distribution of the forces, a plurality of knobs which are distributed over the circumference are advantageously provided. In every case a form fit between the housing and the anchoring element is ensured by a plurality of knobs distributed over the circumference.

The knobs are expediently approximately plate-shaped in cross section. The bottom of the approximately plate-shaped knobs is preferably flat. The knobs thus correspond in cross section approximately to that of the bead in the central region of the longitudinal supports on the anchoring element.

A further advantageous configuration consists in that the knobs are approximately spherical cap-shaped in cross section. Spherical cap-shaped knobs have a low notch effect on the housing. The beads on the longitudinal supports are then correspondingly approximately U-shaped.

The limbs expediently taper in width in a wedge-shaped manner towards their free ends, measured tangentially or over the circumference of the anchoring element. This wedge-shaped taper prevents the radially inwardly bent limbs from overlapping.

So that the pipe coupling can be clamped onto the pipes to be connected to each other, the housing has at least one opening which runs in the axial direction. So that the anchoring element or the sealing element cannot come out radially through this opening, a steel bridge which is elastically deformable or curved in the circumferential direction is advantageously arranged between the housing and the anchoring element, which steel bridge extends over part of the circumference of the housing, with at least one of the ends which point in the circumferential direction being pointed in a V-shaped manner. The steel bridge is prevented from catching in the slots of the anchoring element by the V-shaped, pointed ends.

The tip angle of the pointed ends of the steel bridge is expediently between 60° and 120°, preferably approximately 90°. This angle range ensures that the steel bridge slides away easily over the longitudinal supports of the anchoring element when the pipe coupling is clamped. The steel bridge is generally fixed in the housing, for example by point-welding. If the longitudinal supports of the anchoring element now have a bead, the tip, which points slightly inwards, of the steel bridge can likewise engage in the bead and prevent axial displacement of the anchoring element in the housing.

BRIEF DESCRIPTION OF THE DRAWINGS

The invention is explained in more detail below using the drawings which illustrate it by way of example.

In the figures:

FIG. 10 shows a blank in the extended state, analogously to FIG. 6 but without a cut-out in the region of the webs, FIG. 11 shows a schematic view of part of an anchoring element according to the invention, in a non-deformed state, FIG. 12 shows a schematic view of part of an anchoring element according to the invention corresponding to FIG. 11, in a deformed state, and FIG. 13 shows a partial side view of a pipe with an anchoring element according to the invention engaging inside it.

The list of reference symbols and the patent claims are included in the disclosure content.

DETAILED DESCRIPTION OF THE INVENTION

Figure 1:
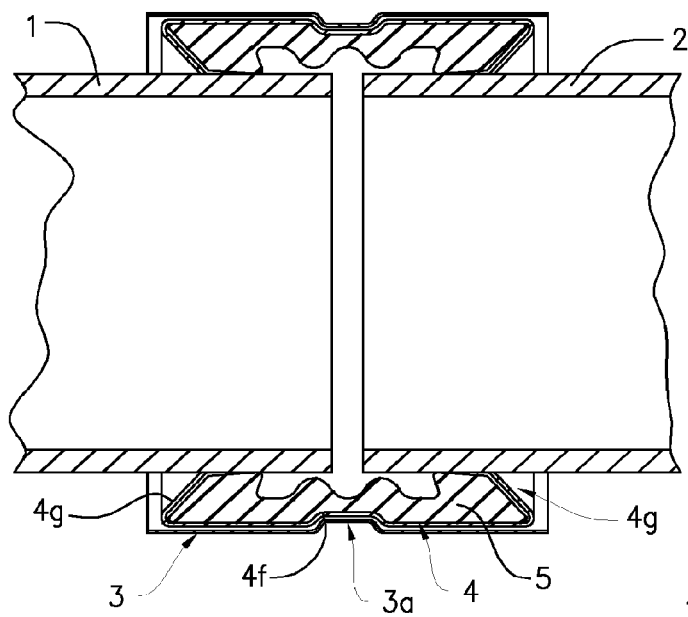
FIG. 1 shows a pipe coupling according to the invention, in longitudinal section

The coupling, which is shown in longitudinal section in FIG. 1, for the force-fitting connection of two flat-ended pipes 1, 2 comprises an essentially cylindrical housing 3 and a sleeve-shaped anchoring element 4 arranged therein. The anchoring element 4 is provided on both its ends with radially inwardly angled limbs 4g. The free ends of the limbs 4g are in force-fitting engagement with the pipes 1, 2. Thus for example axial tensile forces can be transmitted directly by means of the anchoring element 4. The anchoring element 4 is provided in its central region with a bead 4f which preferably extends over the entire circumference. The housing 3 has on its circumference at least one knob 3a which engages in a form-fitting manner in the bead 4f. A circumferential bead can likewise be provided instead of individual knobs 3.

A sealing element 5 consisting of a rubber-elastic material is arranged in the interior of the anchoring element 4.

Figure 2:
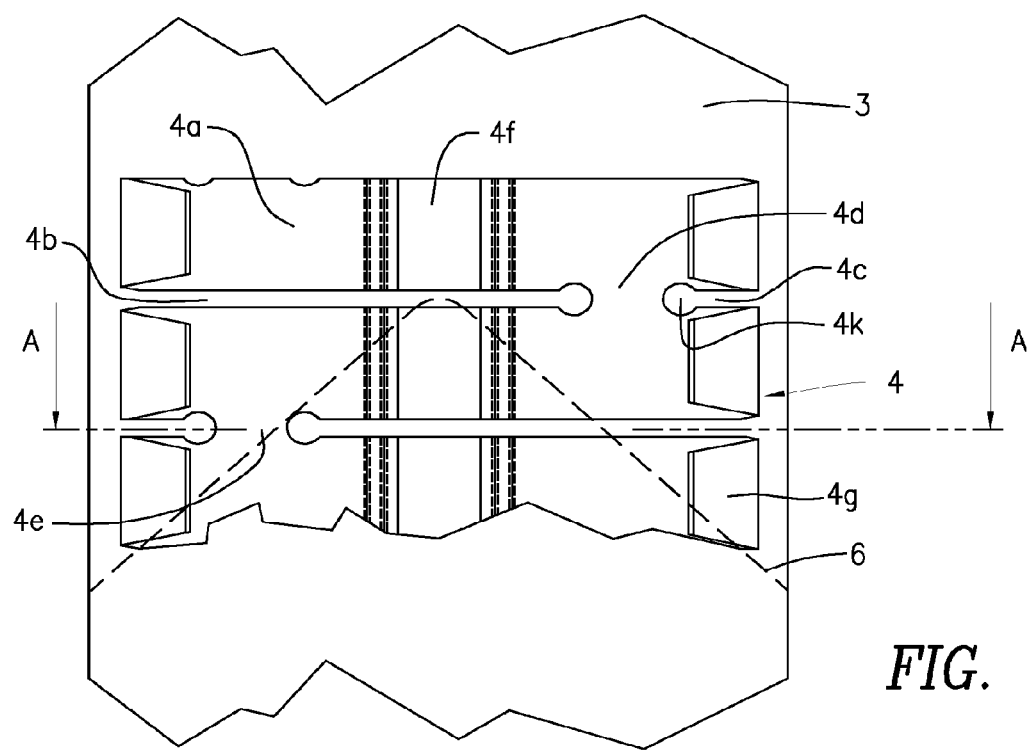
FIG. 2 shows a partially developed view of the housing and the anchoring element arranged inside it, according to FIG. 1

In FIG. 2, a partially developed view of the housing 3 with the anchoring element 4 arranged therein can be seen. The developed anchoring element 4 has longitudinal supports 4a which are arranged parallel to each other and extend in the axial direction. These longitudinal supports 4a are formed by slots 4b, 4c which emanate from both axial ends of the anchoring element. Webs 4d, 4e remain between the slots 4b, 4c. The webs 4d, 4e are bounded by notches 4k at the end of the slots 4b, 4c. The notches 4k on the one hand give the webs 4d, 4e good deformability and on the other hand reduce the notch effect of the slots 4d, 4e. The bead 4f is clearly visible in the central region of the anchoring element 4. The ends of the longitudinal supports 4a are connected to limbs 4g which are bent radially inwards. A steel bridge 6 is arranged between the housing 3 and the anchoring element 4. The steel bridge 6 is used to bridge a gap-like opening (not shown), which allows the clamping of the housing 3, in the housing 3 and to prevent the anchoring element 4 or the sealing element 5 from coming out radially through the gap-like opening.

Figure 3:
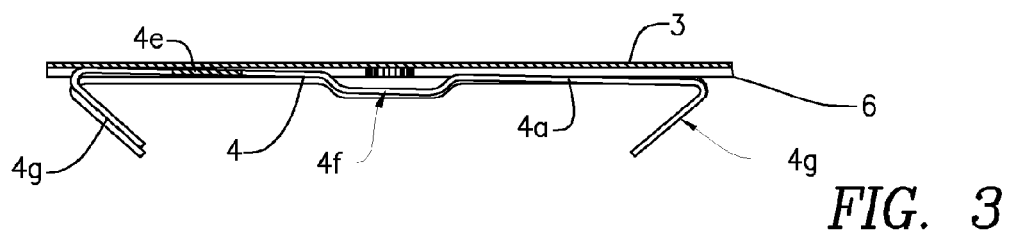
FIG. 3 shows a cross section through the partially developed view according to FIG. 2, along line A-A.

The cross section which can be seen in FIG. 3 shows the housing 3 and the anchoring element 4 which is arranged inside and has an essentially C-shaped longitudinal section. On the anchoring element 4 can be seen the longitudinal supports 4a provided with a bead 4f, the angled limbs 4g and the webs 4d remaining between the longitudinal supports. The flat steel bridge 6 is arranged between the housing 3 and the anchoring element 4.

Figure 4:
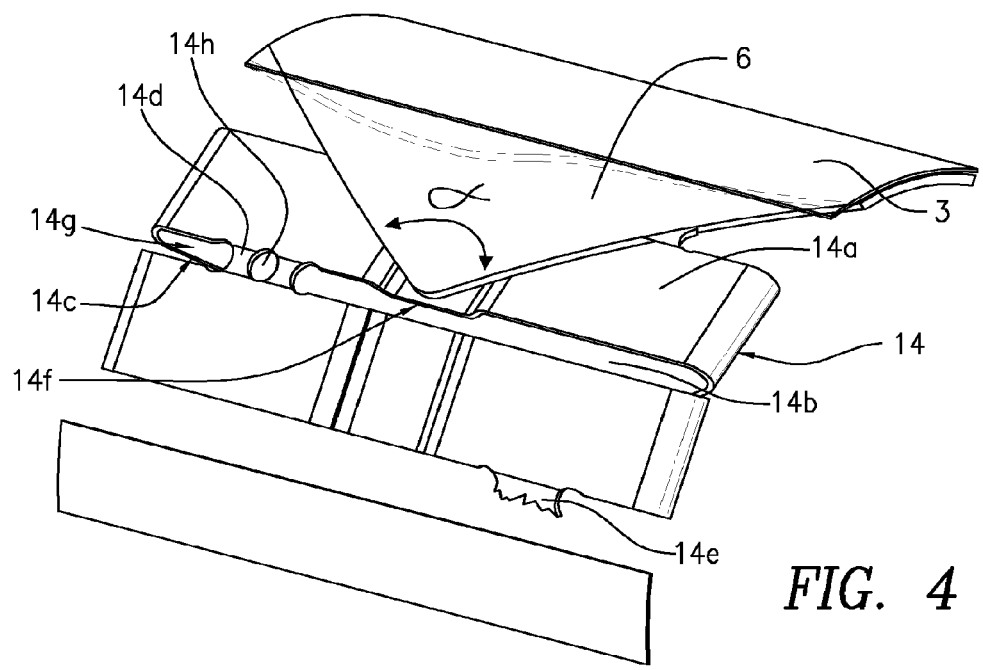
FIG. 4 shows a perspective view of the pipe coupling shown in FIGS. 1 to 3, seen from the outside.

The perspective view which can be seen in FIG. 4 shows a variant of the anchoring element 14 shown in FIGS. 2 and 3. This anchoring element 14 has longitudinal supports 14a which are likewise produced by slots 14b, 14c emanating from both ends and are connected to each other by means of deformable webs 14d, 14e. The webs 14d, 14e on both sides of a longitudinal support 14a are offset with respect to each other in the axial direction. This allows the anchoring element 4 to be compressed or deformed in the circumferential direction. In order to improve the deformability of the webs 14d, 14e further, they are reduced in cross section by a cut-out 14h in the central region, in contrast to the configuration which can be seen in FIG. 2. The steel bridge 6 is arranged between the anchoring element 4 and the housing 3. In this case it can clearly be seen that the ends, which point in the circumferential direction, of the steel bridge are pointed in a V-shaped manner. The tip angle α is approximately 90°. The pointing of the ends of the steel bridge 6 also prevents the steel bridge 6 from "catching" in the slots 14c, 14d and impairing the clamping of the pipe coupling by blocking it.

Figure 5:
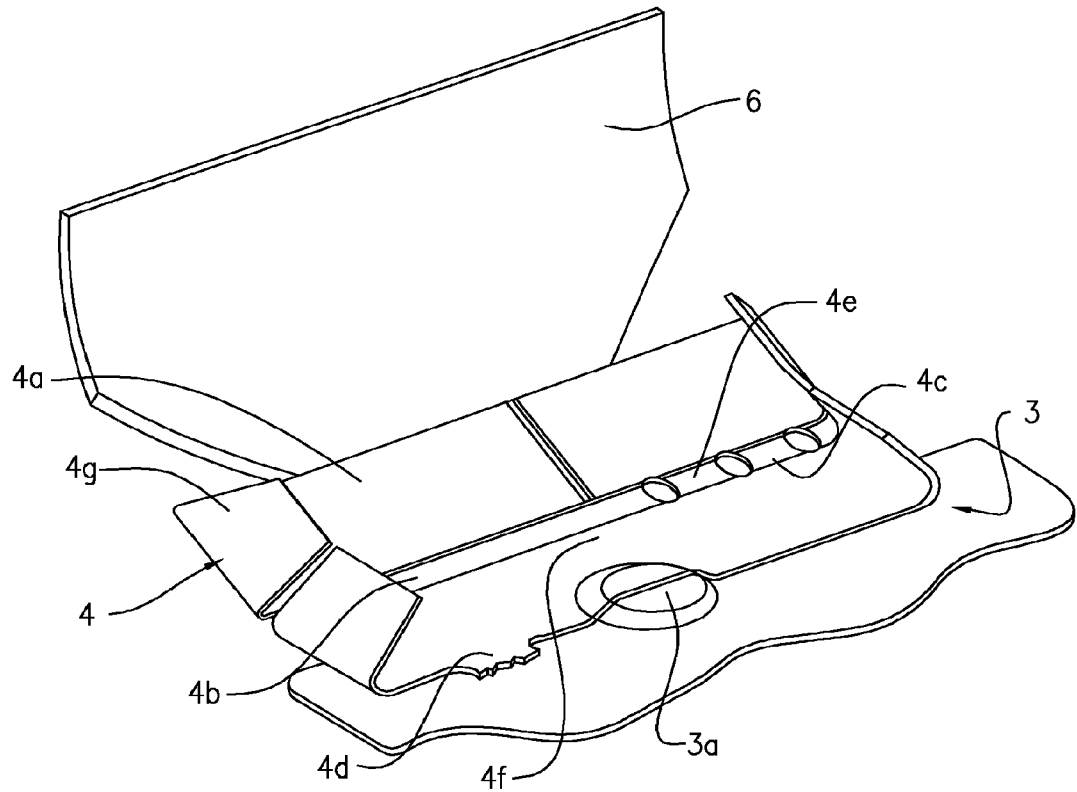
FIG. 5 shows a perspective view of the pipe coupling shown in FIGS. 1 to 3, seen from the inside.

FIG. 5 shows a perspective view of the anchoring element according to FIG. 2 from the inside. In this case it is also clear that the V-shaped end of the steel bridge 6 can slide away over the longitudinal support 4a of the anchoring element 4 without much resistance when the pipe coupling is clamped. The housing is provided with knobs 3a in the central region. The knobs 3a engage in a form-fitting manner into the bead 4f on the anchoring element and thus prevent the anchoring element 4 from being axially displaced with respect to the housing 3.

Figure 6:
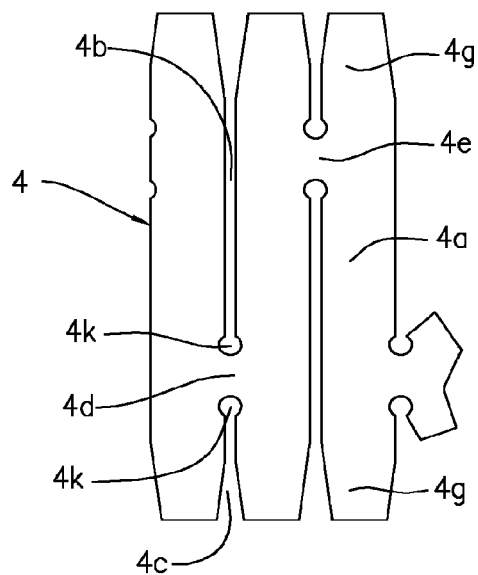
FIG. 6 shows part of a blank for an anchoring element according to the invention, in the extended state.

FIG. 6 shows the blank for an anchoring element 4 in its extended form. This can for example be produced by a continuous stamping process or by laser or water jet cutting from strip material. A shorter or longer piece of the blank is used for producing the anchoring element 4 depending on the nominal diameter of the pipe coupling. The notches 4k at the end of the slots 4b, 4c can clearly be seen from the developed view. The webs 4d, 4e remain between the notches 4k. The ends of the longitudinal supports 4a are connected to limbs 4g, the width of which tapers in a wedge-shaped manner towards the free end.

Figure 7:
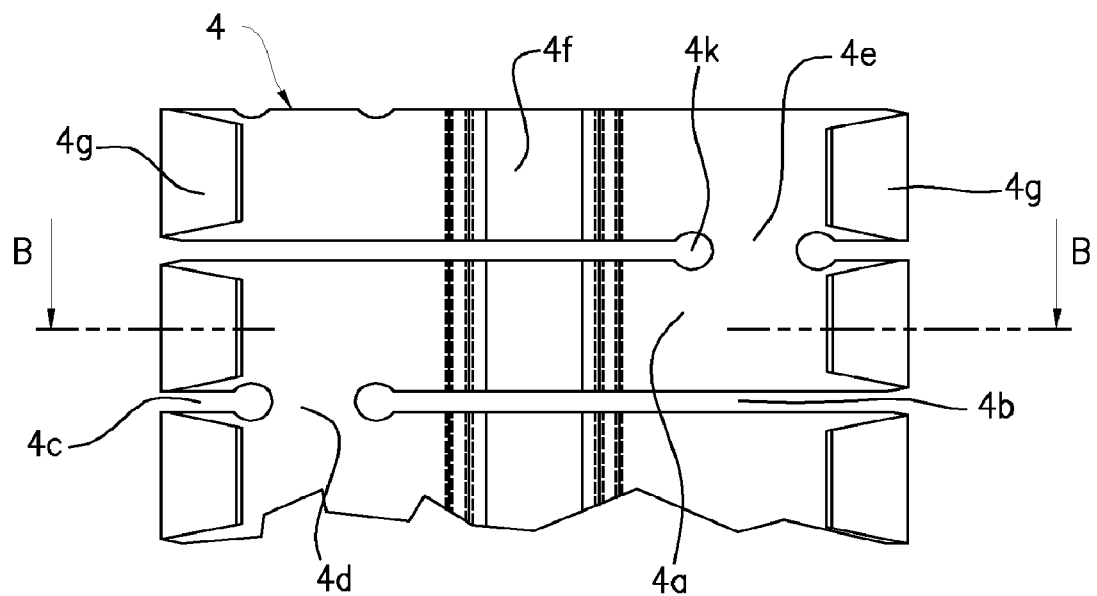
FIG. 7 shows part of an anchoring element according to the invention, in the shaped state.

FIG. 7 shows the anchoring element 4 according to FIG. 2, but without the housing and the steel bridge. In this case the axial offset of the webs 4d, 4e can be seen particularly clearly on both sides of the longitudinal support 4a.

Figure 8:
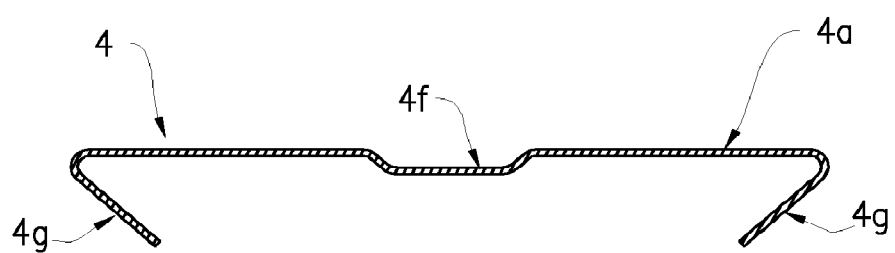
FIG. 8 shows a longitudinal section through the anchoring element shown in FIG. 7, along line B-B.

The longitudinal section through the anchoring element 4 which can be seen in FIG. 8 shows the C-shaped profile with the limbs 4g which are angled inwards from the longitudinal supports. In the centre of the longitudinal supports 4a, they are provided with a bead 4f which projects radially inwards. The bead is essentially U-shaped and preferably has a flat bottom in the longitudinal section of the longitudinal supports.

Figure 9:
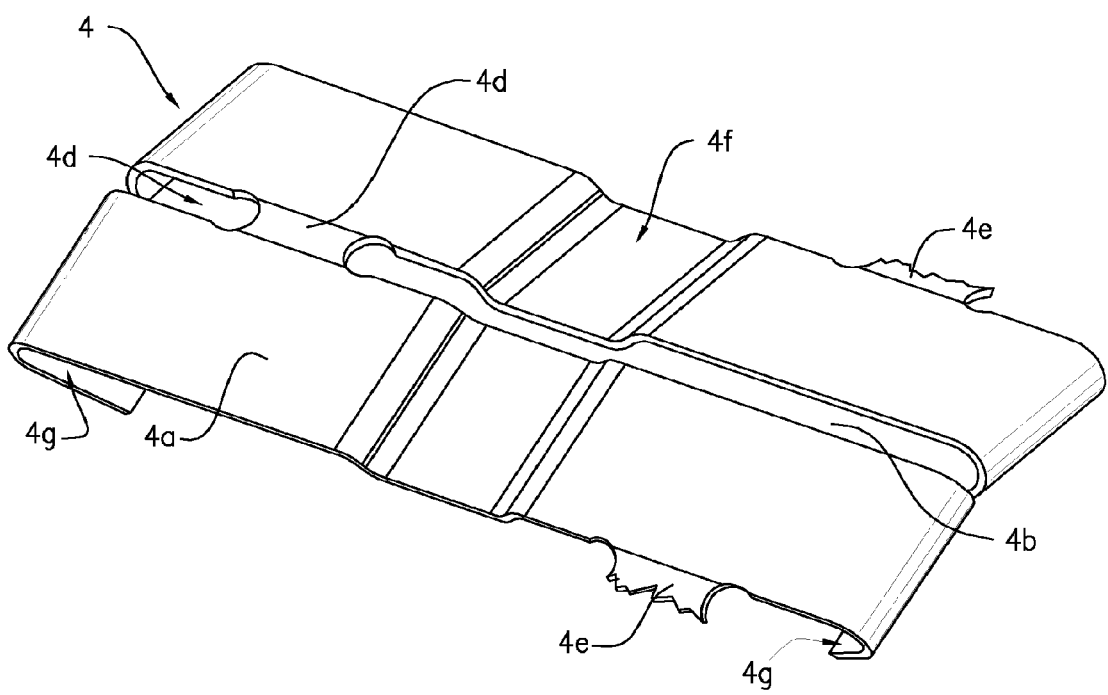
FIG. 9 shows a partial detail of an anchoring element according to the invention, in a perspective view.

FIG. 9 shows a detail of the anchoring element 4 in a perspective view. In this case the longitudinal supports 4a which are formed by the slots 4b, 4c can be seen particularly vividly. The longitudinal supports 4a are only held together by the webs 4d, 4e which remain between the slots 4b, 4c. The fact that the webs 4d, 4e are arranged offset with respect to each other in the axial direction allows a deformability of the anchoring element 4 in the circumferential direction. The limbs 4g which are bent radially inwards can be seen at the ends of the longitudinal supports 4a.

FIGS. 10 to 12 show an anchoring element 10. The blank shown in FIG. 10 is analogous to that in FIG. 6. In FIGS. 11 and 12 the webs 10d, 10e on the longitudinal supports 10a are symbolically replaced by joints.

In the non-deformed state shown in FIG. 11 the longitudinal supports 10a are arranged parallel to each other. When the pipe coupling is clamped, thrust forces acting in the circumferential direction are produced, which cause the longitudinal supports 10a to be pushed together. This pushing together is however prevented in the region of the webs 10d, 10e. The distance measured over 4 longitudinal supports is $L_o$ in the non-deformed state.

In the pushed together state shown in FIG. 12, the longer slots 10b are closed at their free ends. Thanks to the joint action of the webs 10d, 10e, however, the shorter slots 10c are slightly opened. The distance measured over 4 longitudinal supports in the deformed state is now L1 and is less than $L_o$.

The partial side view which can be seen in FIG. 13 shows the anchoring element 4 in the clamped state of the pipe coupling. The slots 4b are closed. The wedge-shaped taper of the limbs 4g means that a gap through which the sealing element can come out only exists between every other limb.

LIST OF REFERENCE SYMBOLS

1 Pipe
2 Pipe
3 Housing
3a Knob
4 Anchoring element
4a Longitudinal support
4b Slot
4c Slot
4d Web
4e Web
4f Bead
4g Limb
4k Notch
5 Sealing element
6 Steel bridge
10 Anchoring element
10a Longitudinal support
10b Slot
10c Slot
10d Web
10e Web
10g Limb
14 Anchoring element
14a Longitudinal support
14b Slot
14c Slot
14d Web
14e Web
14f Bead
14g Limb
14h Cut-out

What is claimed is:

1. A pipe coupling comprising:
an anchoring member, said anchoring member having a first end, said anchoring member having a second end;
said anchoring member having a plurality of longitudinal supports, said plurality of longitudinal supports including, at least, a first longitudinal support, a second longitudinal support, and a third longitudinal support;
said plurality of longitudinal supports each having a respective first end, and said plurality of longitudinal supports each having a respective second end;
said second longitudinal support being situated between said first and third longitudinal supports, with said respective first ends of said first and third longitudinal supports being beside said first end of said second longitudinal support, and with said respective second ends of said first and third longitudinal supports being beside said second end of said second longitudinal support;
a first web connecting said first longitudinal support to said second longitudinal support;
a first slot, said first slot extending from a first side of said first web entirely through said anchoring member first end so as to render said first ends of said first and second longitudinal supports independently movable relative to one another to accommodate variable mutual separation distance;
a second slot, said second slot extending from a second side of said first web entirely through said anchoring member second end so as to render said second ends of said first and second longitudinal supports independently movable relative to one another to accommodate variable mutual separation distance, said second slot being of smaller length than said first slot;

a second web connecting said third longitudinal support to said second longitudinal support;

a third slot, said third slot extending from a first side of said second web entirely through said anchoring member first end so as to render said first ends of said third and second longitudinal supports independently movable relative to one another to accommodate variable mutual separation distance;

a fourth slot, said fourth slot extending from a second side of said second web entirely through said anchoring member second end so as to render said second ends of said third and second longitudinal supports independently movable relative to one another to accommodate variable mutual separation distance, said third slot being of smaller length than said fourth slot so that said first and second webs are arranged offset with respect to each other;

an annular housing member configured to at least in part circumferentially surround over said anchoring member in an annular arrangement; and, a pipe seal configured to seal pipe, said pipe seal disposed under said anchoring member.

2. The pipe coupling as claimed in claim 1 wherein:
said respective first ends of said respective first, second, and third longitudinal supports are limbs angled towards said pipe seal.

3. The pipe coupling as claimed in claim 2 wherein:
at least one of said first ends of at least one of said first, second, or third longitudinal supports has a tapered width.

4. The pipe coupling as claimed in claim 1 wherein:
said first slot is of equal length to said fourth slot.

5. The pipe coupling as claimed in claim 4 wherein:
said second slot is of equal length to said third slot.

6. A pipe coupling as claimed in claim 1 further comprising:
at least one of said first or second webs has a cut-out.

7. A pipe coupling as claimed in claim 1 further comprising:
a curved notch located at a side of said first web.

8. A pipe coupling as claimed in claim 1 further comprising:
a steel bridge between said annular housing member and said anchoring member, said steel bridge having at least one pointed end.

9. A pipe coupling as claimed in claim 1 further comprising:
said plurality of longitudinal supports including a fourth longitudinal support,
said third longitudinal support being situated between said second and fourth longitudinal supports, with said respective first ends of said second and fourth longitudinal supports being beside said first end of said third longitudinal support, and with said respective second ends of said second and fourth longitudinal supports being beside said second end of said third longitudinal support;
a third web connecting said third longitudinal support to said fourth longitudinal support;
a fifth slot, said fifth slot extending from a first side of said third web entirely through said anchoring member first end so as to render said first ends of said third and fourth longitudinal supports independently movable relative to one another to accommodate variable mutual separation distance; and, a sixth slot, said sixth slot extending from a second side of said third web entirely through said anchoring member second end so as to render said second ends of said third and fourth longitudinal supports independently movable relative to one another to accommodate variable mutual separation distance, said sixth slot being of smaller length than said fifth slot.

10. The pipe coupling as claimed in claim 9 wherein:
said fifth slot is of equal length to said first and fourth slots; and,
said sixth slot is of equal length to said second and third slots.

11. A pipe coupling as claimed in claim 9 further comprising:
each of said first, second and third webs have a cut-out.

12. A pipe coupling as claimed in claim 1 further comprising:
a respective bead segment in a central region of at least one of said first, second, and third longitudinal supports.

13. The pipe coupling as claimed in claim 12 wherein:
each of said first, second, and third longitudinal supports has a respective bead segment.

14. A pipe coupling as claimed in claim 12 further comprising:
at least one knob situated on an inner side of said housing to engage said bead segment.

15. The pipe coupling as claimed in claim 14 wherein:
said at least one knob has a profile form-fitting said bead segment.

16. A pipe coupling comprising:
an anchoring member, said anchoring member having a first end, said anchoring member having a second end;
said anchoring member having a plurality of longitudinal supports, said plurality of longitudinal supports including, at least, a first longitudinal support, a second longitudinal support, a third longitudinal support, and a fourth longitudinal support;
said plurality of longitudinal supports each having a respective first end, and said plurality of longitudinal supports each having a respective second end;
said second longitudinal support being situated between said first and third longitudinal supports, with said respective first ends of said first and third longitudinal supports being beside said first end of said second longitudinal support, and with said respective second ends of said first and third longitudinal supports being beside said second end of said second longitudinal support;
said third longitudinal support being situated between said second and fourth longitudinal supports, with said respective first ends of said second and fourth longitudinal supports being beside said first end of said third longitudinal support, and with said respective second ends of said second and fourth longitudinal supports being beside said second end of said third longitudinal support;
a first web connecting said first longitudinal support to said second longitudinal support;
a first slot, said first slot extending from a first side of said first web entirely through said anchoring member first end so as to render said first ends of said first and second longitudinal supports independently movable relative to one another to accommodate variable mutual separation distance;

a second slot, said second slot extending from a second side of said first web entirely through said anchoring member second end so as to render said second ends of said first and second longitudinal supports independently movable relative to one another to accommodate variable mutual separation distance, said second slot being of smaller length than said first slot;

a second web connecting said third longitudinal support to said second longitudinal support;

a third slot, said third slot extending from a first side of said second web entirely through said anchoring member first end so as to render said first ends of said third and second longitudinal supports independently movable relative to one another to accommodate variable mutual separation distance;

a fourth slot, said fourth slot extending from a second side of said second web entirely through said anchoring member second end so as to render said second ends of said third and second longitudinal supports independently movable relative to one another to accommodate variable mutual separation distance, said third slot being of smaller length than said fourth slot so that said first and second webs are arranged offset with respect to each other;

a third web connecting said third longitudinal support to said fourth longitudinal support;

a fifth slot, said fifth slot extending from a first side of said third web entirely through said anchoring member first end so as to render said first ends of said third and fourth longitudinal supports independently movable relative to one another to accommodate variable mutual separation distance;

a sixth slot, said sixth slot extending from a second side of said third web entirely through said anchoring member second end so as to render said second ends of said third and fourth longitudinal supports independently movable relative to one another to accommodate variable mutual separation distance, said sixth slot being of smaller length than said fifth slot;

each of said first, second, and third webs has a respective cut-out;

each of said first, second, and third webs has a respective curved notch located at each of its respective first and second sides;

said fifth slot being of equal length to said first and fourth slots;

said sixth slot being of equal length to said second and third slots;

a respective bead segment in a central region of at least one of said first, second, third, and fourth longitudinal supports;

an annular housing member configured to at least in part circumferentially surround over said anchoring member in an annular arrangement;

at least one knob situated on an inner side of said housing to engage said bead segment, said at least one knob having a profile form-fitting said bead segment;

a steel bridge between said annular housing member and said anchoring member, said steel bridge having at least one pointed end;

a pipe seal configured to seal pipe, said pipe seal disposed under said anchoring member; and, said respective first and second ends of said respective first, second, third, and fourth longitudinal supports are limbs angled towards said pipe seal.

* * * * *